United States Patent [19]

Anderson et al.

[11] 3,969,132
[45] July 13, 1976

[54] SELF-CLEANING WATER TABLE SYSTEM

[75] Inventors: Harry E. Anderson, Pittsburgh;
Kenneth E. Helsel, Sewickley;
Raymond E. Heasley, McKees Rocks, all of Pa.

[73] Assignee: Anderson Engineers, Inc., Carnegie, Pa.

[22] Filed: July 22, 1975

[21] Appl. No.: 598,063

[52] U.S. Cl. ................................. 134/18; 134/24; 266/48
[51] Int. Cl.² ........................ B08B 3/00; F23J 1/00
[58] Field of Search ............... 134/18, 24, 34, 56 R, 134/169 R, 169 C; 266/23 R; 148/9 R; 137/15, 546; 4/10

[56] References Cited
UNITED STATES PATENTS

| | | | |
|---|---|---|---|
| 3,486,744 | 12/1969 | Beyers et al. | 266/23 R |
| 3,526,395 | 9/1970 | Brown | 266/23 R |
| 3,743,259 | 7/1973 | Hennelly | 148/9 R X |
| 3,743,260 | 7/1973 | Alleman et al. | 148/9 R X |
| 3,770,110 | 11/1973 | Boskovitch | 266/23 R X |
| 3,787,247 | 1/1974 | Couch, Jr. | 148/9 R |
| 3,792,846 | 2/1974 | Geffert | 148/9 R X |

OTHER PUBLICATIONS

"Water Flame–Cutting Table," Welding Design & Fabrication Apr. 1975, pp. 106 and 107.

*Primary Examiner*—Robert L. Lindsay, Jr.
*Assistant Examiner*—Richard V. Fisher
*Attorney, Agent, or Firm*—Webb, Burden, Robinson & Webb

[57] ABSTRACT

A self-cleaning water table suitable for use with a burning machine is preferably constructed above-the-floor and includes at least one sloped bottom member having at least one drain channel at the lowermost portion thereof. A retractable seal is provided for selectively opening and closing the top of the drain channel to permit flushing of the channel without interrupting the burning operation. The method of cleaning the water table includes control of the opening, closing, and flushing of the drain channel.

17 Claims, 6 Drawing Figures

SELF-CLEANING WATER TABLE SYSTEM

FIELD OF THE INVENTION

The present application relates to water tables and particularly to a self-cleaning water table suitable for use with burning machines such as those used in plasma arc, oxy-fuel, powder burning and other types of metal burning operations.

BACKGROUND OF THE INVENTION

For many years, water tables have been used to reduce air and noise pollution associated with various metal burning or cutting operations. Recently, there has been a renewed effort to produce and to use more efficient and less expensive means for controlling such pollution.

Prior water tables have included those which are an integral part of the plant floor. Some had sloped bottoms formed in floor material. One prior water table has a sloped bottom above the floor formed in a V-shape and a central sluice in the floor for receiving the burning wastes. Nozzles are positioned to jet water from headers over the sloped members to clean them and nozzles are also positioned in the sluice to jet water through the sluice to clean it. A similar water table includes means on each side of the V-shaped bottom member for providing a uniform flow of cooling water across the bottom and into a central sluice during the burning operation. Below the floor installations are undesirable for several reasons including the need for major excavation (usually of concrete) for the table and associated piping. This excavation and required maintenance can be very difficult and expensive.

Above-the-floor installations have been built. One of these comprised a tank, having sloped bottom members forming a V-shape, which was filled with water. It was located beneath a burning machine. No means was provided for circulating the water in the tank nor for cleaning the tank other than by emptying it.

Another above-the-floor water table has a single sloped bottom member for receiving burning wastes which pass into a waste recovery area where they are physically removed and dumped.

None of the water tables described, however, includes means for self-cleaning the table by selectively opening and closing a drain channel to permit flushing of the channel as desired.

SUMMARY OF THE INVENTION

The present invention provides apparatus which can be manufactured in modular construction, which is practical to ship and easy to erect in the field. It provides means and a method for cleaning the water table, effectively eliminating expensive maintenance and down time. It is applicable to all types of burning operations and can be installed without expensive excavation or destruction of existing plant facilities.

Our invention is a self-cleaning water table suitable for use with a burning machine. The water table is located beneath the burning machine such that the water in the water table receives and quenches waste material or swarf generated by the burning operation. The table has at least one sloped bottom member and a drain channel at the lowermost portion of the sloped member. Preferably, the entire installation is above the plant floor. Means are provided for selectively opening and closing the top of the drain channel and for flushing the waste material from the channel as desired. The flushing of the waste material may be programmed to operate automatically, either independent of or dependent upon the burning operation being performed to remove predetermined amounts of waste material from the table on established schedule.

Preferably, in our water table there are two bottom members which slope toward one another forming a V-shape and having an included angle of approximately 120° or less. In this embodiment, the drain channel, which may be a pipe or other structural member such as a channel member, is located at the lowermost portion or in the center of the V-shape so that waste material which settles on the sloped bottom members will gravitate, or be urged mechanically, into the drain channel. The drain channel is normally open along at least a part of its top length to permit the waste material to pass into the drain channel. When flushing of the drain channel is desired or required, closure means are actuated to close the top of the drain channel to provide a conduit. The drain channel is flushed, preferably, by a stream of water moving at high velocity under pressure of a recirculating pump. Air or other fluids may also be used for flushing. Flushing may be performed without interrupting the burning operation.

In another embodiment of the invention, the bottom of the water table may comprise a single bottom member having a continuous slope from one side or end of the table to the other. In this case, the drain channel is also located at the lowermost end of the member. At least a part of the top of the channel is normally open for receiving waste material from the burning operation, and the drain channel can be closed and flushed in the same manner as in the embodiment previously described.

A modification of the invention particularly useful for a long water table is the provision of a plurality of water table sections joined to form a single table. Each section has all of the elements of a single table; however, each is independently connected to the means for flushing the drain channel. Where sections having sloped bottom members forming a V-shape as in the first embodiment are employed, it is desirable to offset laterally the drain lines to be used. Accordingly, with this modification a 60 foot water table can be made of three sections, each approximately 20 feet long and utilizing three drain channels. By flushing the drain channels at the same time or sequentially, the entire water table can be continuously maintained substantially free of waste material. Use of table sections also reduces the need for large pumping means for flushing water through a continuous drain channel of considerable length.

These and other advantages of the invention will become apparent from the following detailed description of the invention when taken in conjunction with the accompanying drawings.

DETAILED DESCRIPTION OF THE DRAWINGS

DETAILED DESCRIPTION OF THE PREFERRED EMBODIMENTS OF THE INVENTION

Figure 1:
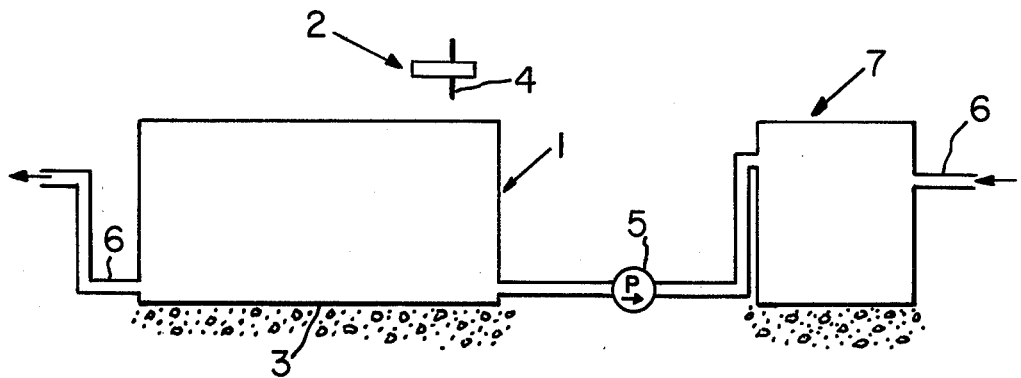
FIG. 1 is a schematic flow diagram of the closed water circulation system of the water table.
Figure 2:
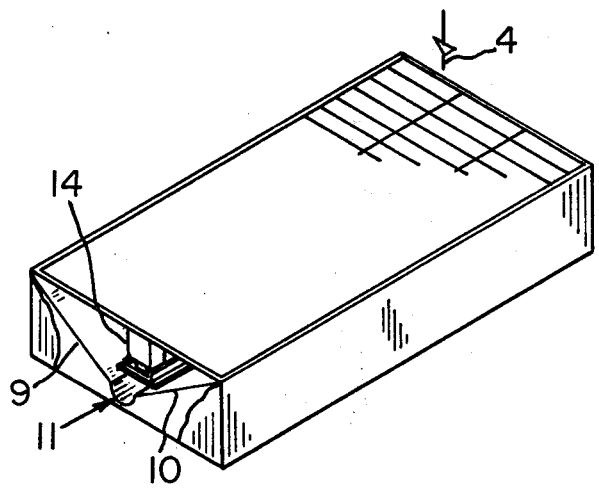
FIG. 2 is a perspective view of the water table of the invention.
Figure 3:
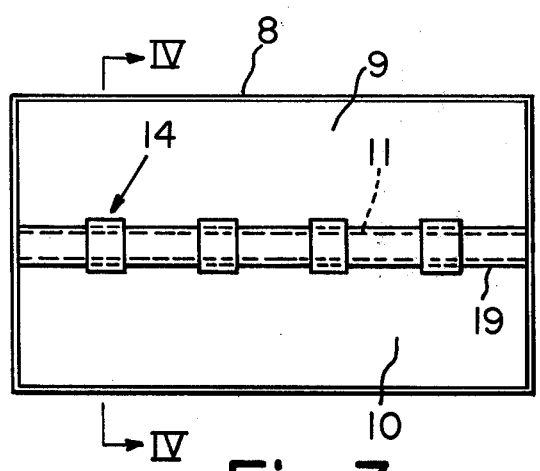
FIG. 3 is a plan view of the water table of the invention.
Figure 4:
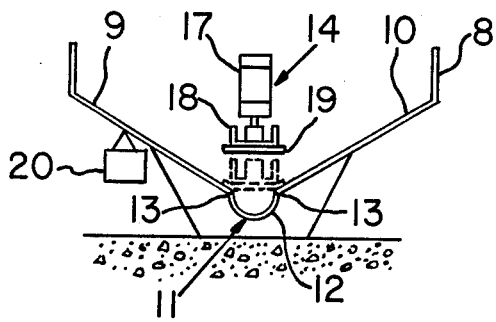
FIG. 4 is a cross-sectional view taken along lines IV—IV of FIG. 3.

Referring to FIGS. 1 through 4, a water table 1 according to the invention suitable for use with a conventional burning machine 2 is positioned beneath the burning machine and above the level of the floor 3. The burning machine includes one or a plurality of burning torches 4 suitable for plasma arc, oxy-fuel, powder burning or other burning operations. A pump 5 is provided to flush waste material through outlet pipe or pipes 6 which are connected to a settling tank 7, which may be remote from the water table or built integrally with it. Additional water may be added to the settling tank to maintain the required level of the water in the water table.

As is evident from FIG. 1, the system is a totally closed system. The water level in the water table is the same as the water level in the tank 7 which is preselected in accordance with the operator's requirements based upon the material used in the burning operation.

The water table 1 has short vertical sides 8 and includes bottom plates or members 9, 10 which slope from the edges of the table in a V-shape toward a central drain channel 11 a part of which is normally open at the top. The bottom members 9 and 10 slope at a preferred angle of approximately 120°. The drain channel 11 is preferably a section of pipe 12 which runs transversely of the bottom members. A portion of the top circumference of the pipe is removed along the length of the pipe and the sides thereof are connected to the bottom members by continuous welds 13.

Closure means 14 are positioned within the water table and are adapted to be moved to close and open the top of the drain channel.

Figure 5:
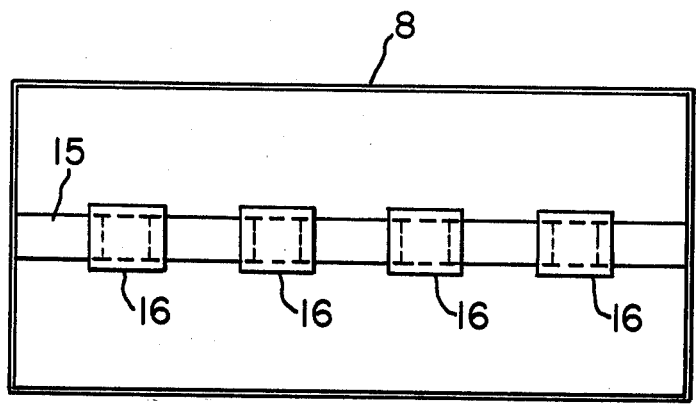
FIG. 5 is a plan view showing a modification of the invention.

The drain channel is preferably 2½ inch Schedule 160 pipe; however, it will be obvious to anyone having skill in the art that any appropriate size of pipe may be used. In addition, any structural member having the configuration of a channel may also be used, whether it be of circular, rectangular or other cross section. The upper end of the pipe 12 is normally completely open. However, it should be understood that the invention also contemplates the use of a pipe or structural member which has only portions thereof open along the top length to provide a series of bridges 15. In such a configuration (as shown in FIG. 5), it will be apparent that a series of closure means 16 may be used to close the openings.

The preferred closure means 14 comprises apparatus which is preferably submerged in the water which fills the water table. The closure means may include any number of means for extending and retracting sealing means for the drain channel. We prefer to use a series of double-acting air cylinders 17 which are sealed against corrosion with an epoxy resin, as is conventional in the art. It is desirable to use at least three and preferably four double-acting cylinders in a table of 20 foot length. Other means, such as an air bag and spring combination wherein the air bag is used to extend the closure member and the spring is used to retract it, are equally functional.

The lower portion of the closure means 14 may include a conventional channel iron 18 to the bottom of which is secured a sealing means which preferably comprises a resilient member, such as a rubber pad 19. When the closure means is extended, the rubber sealing pad 19 (shown in dotted lines in FIG. 4) forceably engages the lowermost faces of the sloping bottom members 9 and 10 forming a substantially leakproof seal. The sealing means may be any of a number of known resilient materials capable of providing a good seal with the bottom members. The seal need not be 100% leakproof to obtain the advantages of the invention.

While we have disclosed a preferred closure means comprising a vertically extendable and retractable sealing means, it should be understood that various other types of closure means may be employed. For example, a member which slides parallel to the bottom portion from one or both sides of the drain channel may be employed to substantially close the normally open top portions of the drain channel. Similarly, the drain channel may include a portion which is rotatable about the axis of the drain channel to provide a self-closing drain channel.

In preliminary testing, it has been found if the bottom members 9, 10 are sloped at an angle of approximately 30° from the horizontal to provide a V-shape having an included angle of approximately 120°, there is fairly good movement of the heavy waste material toward and into the drain channel. At such an angle, however, fines may not move adequately. In a modification, we therefore may provide mechanical means for moving such waste material which does not otherwise gravitate toward and into the drain channel. One such means is a mechanical vibrator 20 positioned under the bottom member 9 and/or 10 to cause the bottom member to vibrate resulting in the waste material moving toward and into the drain channel as required.

We also contemplate the use of a single sloped bottom member which has at its lowermost end a drain channel of the type previously described. In this case, the member may slope from one side of the tank chamber to the other or from one end of the tank chamber to the other. Means are also provided for closing the top of this drain channel and for flushing it.

Figure 6:
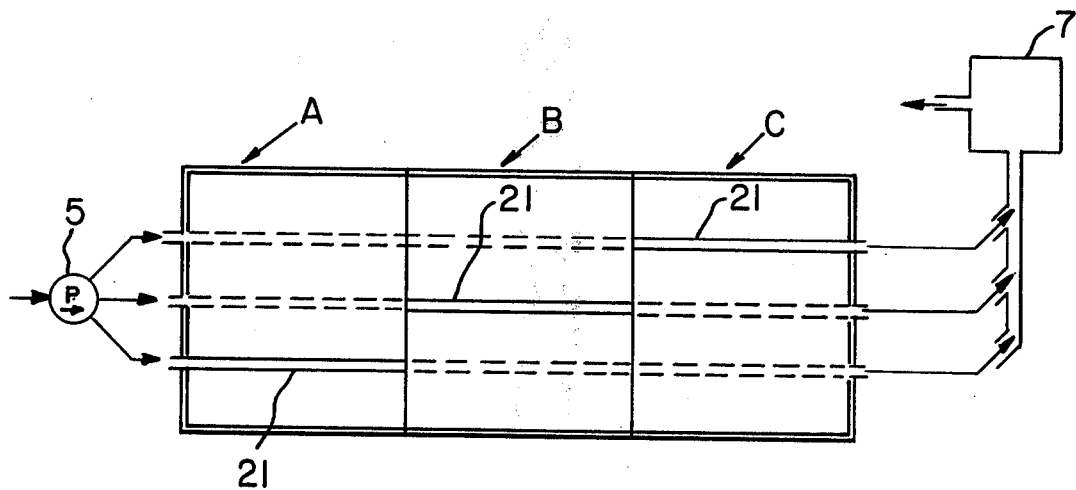
FIG. 6 is a plan view showing a further modification of the invention.

The drain channel may be offset from the centerline of the water table either toward one side or one end of the water table whether the table is constructed in one or a plurality of sections. As shown in FIG. 6, in a table which includes several sections A, B and C, each section includes a drain channel 21 which is independently connected to the settling tank 7 through a single pump 5 or plural pumps. Where a large burning table is employed, use of several sections to form the water table insures that large accumulations of waste materials will not occur and, since a smaller drain channel is used, a smaller pump or pumps may be used.

In normal operation, as swarf or waste material settles during the burning operation to the bottom members 9, 10 of the water table, the waste material tends to gravitate, or is moved mechanically, toward the drain channel 11 which is normally open along at least a part of its top length. When a predetermined amount of waste material has settled, or if the apparatus is programmed to cycle cleaning of the waste material, the closure means 14 is selectively activated to extend the air cylinders 17 and thus the rubber pad 18 carried thereby into sealing engagement with the edges of the bottom members of the water table to substantially close the top of the drain channel 11 forming a conduit.

After the drain channel is closed, the pump 5 is activated to flush the conduit with water under pressure causing a high velocity flow, preferably at least eight feet per second. The velocity of the water must be sufficiently great to move the waste material through the drain channel and into the settling tank 7. Thus, the pump size selected depends upon the size of the drain channel, the amount of waste material to be moved, and the amount of leakage which can be tolerated. The smaller the drain channel, the smaller the pump required.

It is contemplated that the closure means be operated on a programmed or timed cycle, that is, a cycle in which an operator does not control flushing of the water table. The cycle may be independent of or dependent upon the cycle of the burning operation being performed. The timer is preset and controls the operation of both the means for closing and the means (such as a pump) for flushing the drain channel. In this operation, the air cylinders are energized, moving the sealing means or pads against the open top portion of the drain channel forming a conduit and the pump is actuated causing high velocity water to be forced under pressure through the drain channel or conduit. Once the channel is flushed, the cylinders are retracted. The entire cycle can take place while the burning operation continues.

Our water table is highly versatile in that it is suitable for plasma, oxy-fuel, powder or any other kind of burning. The arc energy of plasma is extremely violent and requires sufficient water depth to quench the activity of the arc as it passes the burning table during the operation. Our table provides such depth. In addition, the cleaning of our table can take place without substantially disturbing the surface of the water, that is, the water surface remains "quiet" a desirable condition in any cutting or burning operation, particularly with plasma arc burning.

Because our table is self-cleaning, the settling area can be located substantially remotely from the area of the burn table, thus making available plant space usable for the entire burning table. All piping from our water table to the settling tank can be placed above the floor; however, it is possible to locate the piping in raceways beneath the floor level, if desired.

Having described presently preferred embodiments of the invention, it will be understood that the invention is not limited thereto but is limited only by the scope of the appended claims.

We claim:

1. A self-cleaning water table suitable for use with a burning machine wherein the water table is positioned beneath the burning machine and is filled with water to an appropriate level for the burning operation to be performed, the water table having at least one sloped bottom member onto which waste material is precipitated during the burning operation, a drain channel having at least a part of the top thereof normally open positioned at the lowermost portion of the sloped member for receiving the waste material from the sloped member, means for closing the top of the drain channel to form a conduit and means for moving fluid through said conduit under pressure to flush the waste material out of the drain channel.

2. In combination with a water table having at least one sloped bottom member onto which waste material is precipitated during a burning operation and a drain channel positioned at the lowermost portion of the sloped member and having a top opening for receiving the waste material from the sloped member, the improvement in means for cleaning said table comprising:
   A. means for closing the top opening of the drain channel to form a conduit; and
   B. means for moving fluid through the conduit under pressure to flush the waste material out of the drain channel.

3. Means for cleaning the table as set forth in claim 2 wherein the closing means comprises:
   A. a pneumatic cylinder adapted to move for closing the drain channel; and
   B. sealing means connected to the cylinder and adapted to seat over the drain channel when the cylinder is moved to close the drain channel for flushing of the waste material.

4. Cleaning means as set forth in claim 3 and having means for moving the sealing means to open the drain channel after the drain channel has been flushed.

5. Cleaning means as set forth in claim 2 wherein the means for moving fluid through the drain channel comprises a pump capable of moving the fluid at sufficient velocity to move waste material through the drain channel.

6. Cleaning means as set forth in claim 2 wherein the drain channel comprises an elongated pipe having an opening in at least a part of its top length to permit waste material to pass into the drain channel from the sloped bottom member of the water table.

7. Cleaning means as set forth in claim 6 wherein the entire top length of the pipe forming the drain channel is open.

8. Cleaning means as set forth in claim 2 wherein the slope of the bottom member of the water table is approximately 30° to the horizontal.

9. Cleaning means as set forth in claim 2 and having means for vibrating the bottom member of the water table to facilitate movement of the waste material into the drain channel.

10. Cleaning means as set forth in claim 2 and having means for moving the closing means to open the drain channel after the drain channel has been flushed.

11. Cleaning means as set forth in claim 2 and including a pair of sloped bottom members, each member being sloped toward the other and the drain channel extending between the lowermost portions of the members to receive waste material from each.

12. Cleaning means as set forth in claim 2 wherein the water table including the drain channel is entirely located above the level of and is supported by a floor.

13. In combination:
   A. a burning machine including a burning torch for cutting metal objects; and
   B. a water table located beneath the burning machine and above a floor and filled with water for receiving waste material generated by the cutting operation, said water table comprising:
      1. a pair of sloped bottom members formed in a V-shape;
      2. a drain channel open at the top along at least a part of its length extending between said members at the lowermost portions thereof;
      3. means for opening and closing the top of the drain channel; and
      4. means for moving water through said channel under pressure when the top of the channel is closed to flush waste material out of the drain channel.

14. A method of cleaning a water table suitable for use in burning operations wherein waste material is precipitated upon a sloped bottom member of the table for movement into a drain channel having a part of the top length thereof open and located at the lowermost portion of the sloped bottom member comprising:
  A. closing the open top length of the drain channel against admission of waste material;
  B. flushing the closed drain channel by forcing fluid under pressure through said channel; and
  C. opening the drain channel to permit admission of waste material into the drain channel.

15. A method of cleaning a water table as set forth in claim 14 wherein the fluid is water.

16. A method of cleaning a water table as set forth in claim 15 and including programming the opening, closing, and flushing of the drain channel in a predetermined cycle.

17. A method as set forth in claim 16 wherein the opening, closing and flushing of the drain channel is programmed in a cycle dependent upon the cycle of the burning operation being performed.

* * * * *